Figure 1:
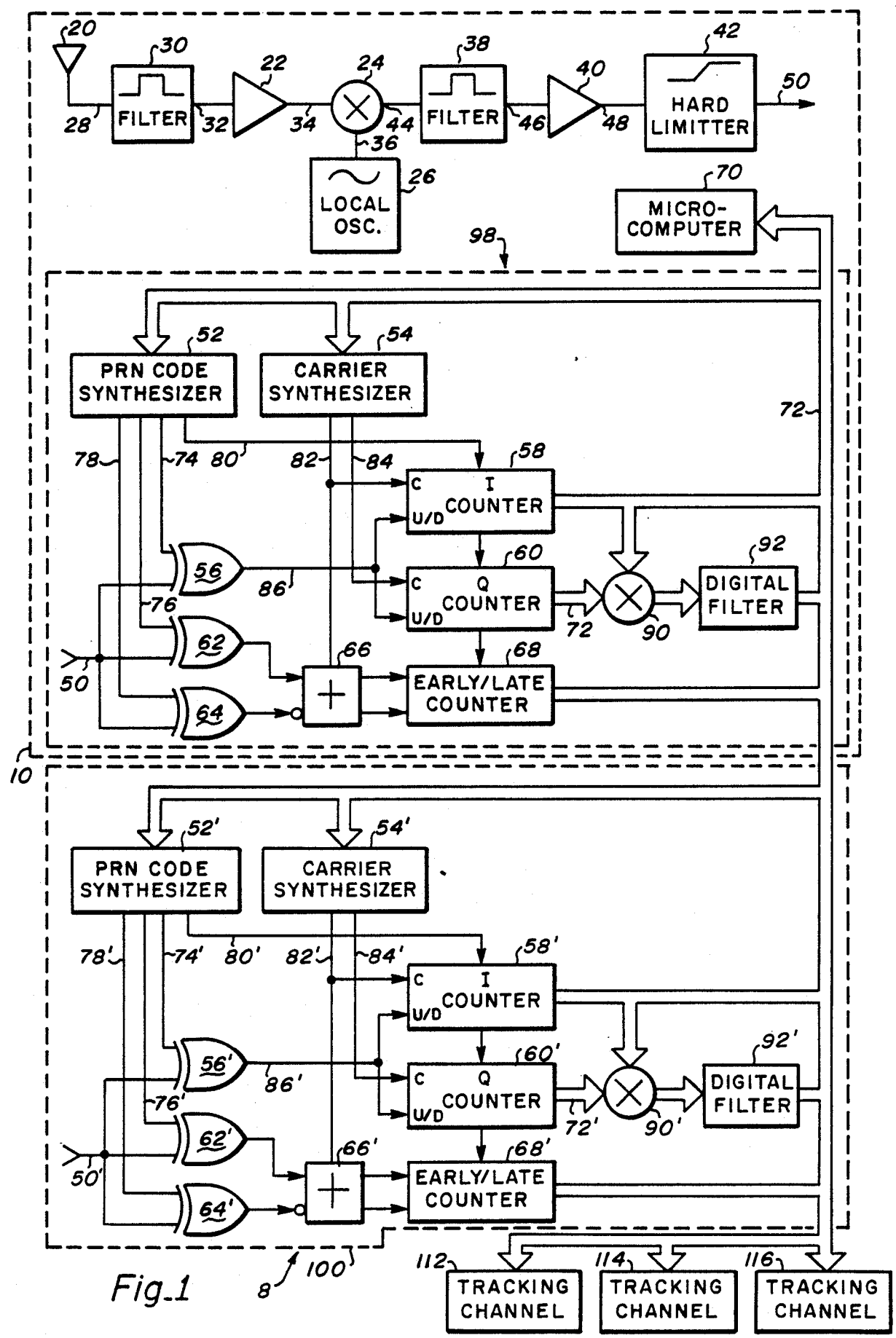

United States Patent [19]

Braisted et al.

[11] Patent Number: 4,970,523

[45] Date of Patent: Nov. 13, 1990

[54] DIFFERENTIAL DOPPLER VELOCITY GPS RECEIVER

[75] Inventors: Paul E. Braisted, San Jose; Ralph F. Eschenbach, Redwood City, both of Calif.

[73] Assignee: Trimble Navigation, Ltd., Sunnyvale, Calif.

[21] Appl. No.: 328,870

[22] Filed: Mar. 27, 1989

[51] Int. Cl.[5] ............................. G01S 5/02; G01S 3/52
[52] U.S. Cl. ....................................... 342/418; 342/356
[58] Field of Search ......................... 342/356, 357, 418

[56] References Cited

U.S. PATENT DOCUMENTS 4,751,512  6/1988  Longaker ............................ 342/357
4,797,677  1/1989  MacDoran et al. ................. 342/352

Primary Examiner—Theodore M. Blum
Attorney, Agent, or Firm—Thomas E. Schatzel

[57] ABSTRACT

To reduce error introduced by the local oscillator in the velocity calculations, the receiver has two "tracking channels" and a microcomputer. With numbers required to, simultaneously, lock each of the "tracking channels" each to a respective satellite signal, the microcomputer employs a differential doppler technique to calculate the receiver velocity. The microcomputer calculates a number which represents the difference between the apparent doppler frequency shift of the carrier signal which is transmitted by the first "tracking channel" satellite and which is measured over a specific time period and the apparent doppler frequency shift of the carrier signal which is transmitted by the second "tracking channel" satellite and which is measured over substantially the same time period.

10 Claims, 1 Drawing Sheet

DIFFERENTIAL DOPPLER VELOCITY GPS RECEIVER

TECHNICAL FIELD

The present invention relates to radio receivers generally and more particularly to a GPS satellite receiver employing a differential doppler technique for velocity computation.

BACKGROUND ART

The NAVASTAR Global Positioning System (GPS) is a United States Defense Department satellite-based radio-navigation system transmitting information from which extremely accurate navigational information can be computed including the time, the user's three-dimensional position anywhere on or near the Earth, and the user's three-dimensional velocity. When fully operational, the GPS is planned to employ 18 satellites evenly dispersed in three, inclined, 12-hour circular orbits chosen to insure continuous 24-hour coverage worldwide. Each satellite carries extremely accurate cesium and rubidium vapor atomic clocks providing timing information. Additionally, each satellite is provided clock correction and orbital information by Earth-based monitoring stations.

Each satellite transmits a pair of L-band carrier signals including an L1 signal having a frequency of 1575.42 MHz (also referred to as 1540 fO where fO is 1.023 MHz) and an L2 signal having a frequency of 1227.6 MHz (1200 fO). The L1 and L2 signals are biphase modulated by pseudo-random noise (PRN) codes. The PRN codes facilitate multiple access. Since each satellite uses different PRN codes, a signal transmitted by a particular satellite can be selected by generating and matching (correlating) the corresponding PRN code pattern. Additionally, the PRN codes facilitate signal transmit time measurements which can be made by measuring the phase shift required to match the code. Both of the carrier signals (L1 and L2) are modulated by a PRN code which is referred to as a precision (p) code. The p PRN code, which is intended for military purposes, is a relatively long, fine-grained, precision code having a clock rate of 10.23 MHz (10 fO). The L1 carrier signal is additionally modulated by a PRN code which is referred to as a clear/acquisition (C/A) code. The C/A PRN code, which is intended for rapid signal acquisition and for commercial purposes, is a relatively short, coarsegrained code having a clock rate of 1.023 MHz (fO) and a code length of 1023 bits (one millisecond). A full bit (chip) of C/A PRN code, phase delay corresponds to a distance of 293 meters. In addition to the PRN codes, both of the signals (L1 and L2) are, continuously, biphase modulated by a 50 bit per second, 1500 bit long, navigation data bit stream. The navigation data bit stream includes information as to the status and empheneris of all satellites, parameters for computing the particular satellite clock, and corrections for atmospheric propagation delays.

Disclosed in the U.S. Pat. No. 4,754,465 of Charles R. Trimble is a Global Positioning System Course Acquistion Code Receiver suitable for computing the time, position, and velocity information. Unfortunately, to accurately compute the velocity information, the above mentioned receiver requires the use of a relatively stable, and, thus, relatively expensive, local oscillator (26).

Specifically, to compute the velocity information, the above mentioned receiver measures, in turn, the apparent doppler frequency shift of the 1540 fO (L1) carrier signal transmitted by each of four satellites. From the apparent doppler frequency shift information, from information as to the position of the receiver, and from information as to the position and the velocity of each of the four satellites, the receiver solves four equations in four unknowns to obtain the velocity information.

Each of the four equations are of the form:

$$D_i = (\bar{v}_i \cdot \bar{r}_i + \bar{v}_u \cdot \bar{r}_i)(2f_c/c) + (f - f_o) \quad (1)$$

where:

$D_i$ is the apparent doppler frequency shift in Hz of the 1540 fO carrier signal of the ith satellite, as measured at the receiver;

$\bar{v}_i$ is the (three dimensional) velocity of the ith satellite in meters per second, as calculated from the navigational data transmitted by the satellite;

$\bar{r}_i$ is a unit vector pointing from the ith satellite to the receiver, as calculated from the position of the receiver (previously calculated) and the position of the satellite (calculated from the navigational data transmitted by the satellite);

$\bar{v}_u$ is the (three dimensional) velocity of the receiver in meters per second, the three components of which ($v_x$, $v_y$, and $v_z$) represent three of the four unknowns;

$f_c$ is the satellite (L1) carrier frequency 1540 fO in Hz;

c is the speed of light in meters per second; and $(f - f_o)$ is a receiver frequency offset (error) in Hz, introduced, at least in part, by the receiver local oscillator (26), the fourth unknown.

In the above mentioned receiver, in computing the velocity information, it is assumed that the $(f - f_o)$ receiver frequency offset (error) is constant (stable) during the period of time required to make the four doppler frequency shift measurements. To the extent that the $(f - f_o)$ receiver frequency offset (error) changes from one doppler frequency shift measurement to the next, an error is introduced in the velocity information computed. Thus, to minimize the error, the above mentioned receiver uses a relatively stable, and, thus, relatively expensive, local oscillator (26).

DISCLOSURE OF THE INVENTION

It is therefore an object of the present invention to provide a GPS satellite receiver which employs a local oscillator of relatively low stability.

Another object of the present invention is to provide a GPS satellite receiver which is relatively simple, inexpensive, and compact.

Briefly, the presently preferred embodiment of a differential-doppler-velocity GPS satellite receiver in accordance with the present invention has a "receiver channel" which employs an L-band antenna for GPS signal reception, a bandpass filter for attenuating off-frequency signals, a (first) amplifier for establishing the receiver noise figure, and an image-reject mixer all connected in cascade. A half-frequency local-oscillator-signal-generating oscillator connected to drive the mixer is employed. Also employed is a bandpass filter, another (second) amplifier and a hard limiter all connected in cascade from the mixer output. The hard limiter converts the down-converted satellite signal and associated noise from analog-to-digital form.

Additionally, the receiver has at least two "tracking channels" each of which employs a phase-controlled synthesizer for generating each of the pertinent PRN codes each in the form of a punctual, an early and a late signal and a frequency-controlled synthesizer for digitally developing, phase-quadrature signals at the down-converted (doppler-shifted) carrier signal frequency. An exclusive-OR gate connected to develop a signal by comparing the signal developed by the hard limiter with the punctual PRN-code signal and a pair of counters connected to be clocked in quadrature by the doppler-shifted-carrier-signal-synthesizer-developed signals and to be incremented/decremented responsive to the state of the gate-developed signal are employed to remove the PRN-code-modulation information and to develop an in phase (I) and a quadrature (Q) Castas-loop signals. Circuitry represented by a pair of exclusive-OR gates connected to develop a pair of signals by comparing the hard-limiter-developed signal one with the early PRN-code signal and the other with the late PRN-code signal; an adder connected to develop a signal by summing the exclusive-OR-gate-pair-developed signals and a counter connected to be clocked by the in-phase one of the doppler-shifted-carrier-signal-synthesizer-developed signals and incremented/checked/-decremented responsive to the state of the adder-developed signal is employed to develop a signal used to minimize PRN-code-phase-matching error.

Finally, the receiver employs a microcomputer connected to receive the in phase (I), the quadrature (Q) and the matching-error signals developed by each of the "tracking channels," to control the phase of the PRN-code synthesizer in each of the "tracking channels," to control the frequency of the doppler-shifted-carrier-signal synthesizer in each of the "tracking channels," and to compute the position and velocity information.

These and other objects of the present invention will no doubt become apparent to those skilled in the art after having read the detailed description of the presently preferred embodiment of the present invention which is illustrated in the figure of the drawing.

BRIEF DESCRIPTION OF THE FIGURE IN THE DRAWING

FIG. 1 is a block diagram illustrating the presently preferred embodiment of a differential-doppler-velocity GPS satellite receiver in accordance with the present invention.

BEST MODE FOR CARRYING OUT THE INVENTION

Illustrated in FIG. 1 of the drawing generally designated by the number 8 is the presently preferred embodiment of a differential-doppler-velocity GPS satellite receiver in accordance with the present invention. Except as indicated, receiver 8 employs the components of the receiver which is disclosed in the above-identified United States Patent of Charles R. Trimble. The components of the later receiver are collectively designated by the number 10. More particularly, receiver 10 has a "receiver channel" which employs an L-band antenna 20, a (first) amplifier 22, an image-reject mixer 24, and a local oscillator 26. In the presently preferred embodiment, antenna 20 is of the quadrifilar-helix-type. For clarity, antenna 20 is shown connected by a line 28, a band-pass filter 30 and a line 32 to the input of amplifier 22. In the presently preferred embodiment, the filtering function is performed by amplifier 22 which, preferably, is of the two-stage GaAs-FET type to provide a signal gain of 35 db and a three db bandwidth of 200 MHz at 1540 fO. Mixer 24, which is configured with the mixer RF input connected to the output of amplifier 22 by a line 34 and the mixer LO input connected to the output of local oscillator 26 by a line 36, is of the starved-LO balance-type to cancel (reject) signals and noise at the mixer image frequency (1532 fO).

Oscillator 26 is operative to generate a 768 fO signal the level of which is sufficient to cause mixer 24 to double the frequency of the signal to 1536 fO for mixing with L1 (1540 fO) satellite signals to down convert the frequency of the satellite signals directly to four fO. Although an oscillator of the stability of the oscillator employed in the receiver in the above-identified United States Patent of Charles R. Trimble, may be employed, for reasons which will become apparent shortly, such stability is not required. In the present invention, a relatively less stable (and, thus, relatively less expensive) oscillator is employed.

Receiver 10 also employs in the "receiver channel" a filter, designated 38, another (second) amplifier, designated 40, and a hard limiter 42. Filter 38, which is connected to the output of mixer 24 by a line 44, and to the input of amplifier 40 by a cable 46, is of the six-pole, passive, band-pass-type having a center frequency of four fO and a three db bandwidth of two MHz. Amplifier 40 provides a gain of approximately 40 to 50 db, the gain being chosen to insure that hard limiter 42 provides hard limiting. Hard limiter 42, which is configured with the limiter input connected to the output of amplifier 42 by a cable 48 and the limiter output connected to a line 50, is employed to convert from analog to single-bit-digital form the down-converted satellite signal and associated noise developed by amplifier 40 on line 48.

As previously indicated, hard limiter 42 is employed to convert from analog-to-digital form the signal developed by amplifier 40 on line 48, which includes both the down-converted satellite signal and the associated noise. Because of the bandwidth, the level of the noise is substantially greater than the down-converted satellite-signal level. However, no information is lost.

Additionally, receiver 10 has a "tracking channel" which employs a phase-controlled PRN-code-signal synthesizer 52, a frequency-controlled doppler-shifted-carrier-signal synthesizer 54, an exclusive-OR gate 56, two counters, designated 58 and 60, two additional exclusive-OR gates, designated 62, and 64, an adder 66, and another counter 68. Although not included in the "tracking channel," receiver 10 also employs a microcomputer (controller) 70. Synthesizer 52 is responsive to signals developed on a bus 72 by microcomputer 70 both for selecting a PRN-code and for controlling the phase of the code and operative to develop signals including on a line 74 a punctual PRN-code signal, on a line 76 a similar signal advanced (early) one-half bit (with respect to the punctual signal), on a line 78 a similar signal retarded (late) one-half bit (also with respect to the punctual signal), and on a line 80 a PRN-code-timing (epoch) signal.

Synthesizer 54, which is of the numerically controlled type, is responsive to a digital number, represented by signals developed by microcomputer 70 on bus 72, and operative to generate, to within one-quarter Hz resolution, a pair of digital signals, in phase quadrature, each on a corresponding one of a pair of lines, designated 82 and 84. For this purpose, synthesizer 54 includes a first and a second latch and a 24-bit adder. The first latch is configured to store the state of the number signals developed by microcomputer 70 on bus 72. The second latch, which is clocked by a constant-frequency clocking signal, is configured to store (for one cycle of the clocking signal) the state of signals developed at the output of the adder. The adder is configured to add the number represented by the (microcomputer developed) signals stored in the first latch with the number represented by the (adder developed) signals stored (during the previous clock cycle) in the second latch to develop (sum) signals for storage in the second latch (during the next clock cycle).

For clarity, a single exclusive-OR gate, gate 56, is shown connected to compare the state of the signal developed by hard limiter 42 on line 50 with the state of the punctual PRN-code signal developed by synthesizer 52 on line 74 to develop on a line 86 a signal for driving both counters 58 and 60. In the presently preferred embodiment, two exclusive-OR gates are used, one for driving counter 58 and the other for driving counter 60. Further, the signals for driving the former gate are each latched for proper timing.

Counters 58, 60, and 68 are reset responsive to the PRN-code-timing (epoch) signal developed by synthesizer 52 on line 80. Further, counter 68 is incremented when the state of a given one, and only one, of the early and late PRN-code signals developed on lines 76 and 78 is the same as (correlates in state with) the state of the signal developed by hard limiter 42 on line 50, decremented when only the other one correlates, and not changed (checked) when both correlate or neither correlates.

Microcomputer (controller) 70 is connected to bus 72 both to receive the signals developed by counters 58, 60, and 68 and to develop signals for controlling synthesizers 52 and 54. To receive the L1 signal transmitted by a particular satellite, microcomputer 70 is operative to cause PRN-code synthesizer 52 to develop the associated PRN code. Also, microcomputer 70 is responsive to the signals developed by (early/late) counter 68 and operative to control the phase of the synthesizer 52 developed PRN-code signals so as to phase-lock the phase of the punctual PRN-code signal developed on line 74 to the phase of the corresponding down-converted satellite signal. Additionally, microcomputer 70 is responsive to the signals developed by (Q) counter 60 and operative to control the frequency of the synthesizer 54 developed doppler-shifted-carrier signals so as to form a Q-type Castas-loop, phase-locking the frequency of the synthesized signals to the frequency of the down-converted satellite signal. Further, microcomputer 70 is responsive to the transmit time information obtained from controlling synthesizer 52, the relative velocity information obtained from controlling synthesizer 54 and the navigational data bit stream information obtained from (I) counter 58 and operative to compute the position and velocity information.

Microcomputer 70 compensates for the (navigational data bit stream) biphase modulation on the down-converted satellite signal to phase-lock synthesizer 54. Specifically, microcomputer 70 is responsive to the binary state of the signal representing the sign bit of the (count) signals developed by (I) counter 58 and operative to invert/or not, the sign bit signal of the (Q) counter 60 developed signals. For clarity, the sign-bit-inverting and subsequent digital-filtering steps performed by microcomputer 70 are represented by separate blocks including a mixer 90 and a second-order discrete-time-sample filter 92.

Further, microcomputer 70 compensates for variations in the down-converted satellite-signal level to maintain the synthesizer 54 phase-locked-loop-gain constant. Microcomputer 70 is responsive to the (I) counter 58 signals and operative to adjust the filter 92 gain parameters. (Note that rather than reflecting the signal level, the (I) counter 58 developed signals reflect the signal to noise ratio. However, the noise level is relatively constant.)

As previously indicated, synthesizers 52 and 54, gate 56, counters 58 and 60, gates 62 and 64, adder 66, counter 68, adder 90, and digital filter 92, which are collectively designated 98, form what is referred to herein as a (first) "tracking channel." Unlike the receiver (10) which is disclosed in the above-identified United States Patent of Charles R. Trimble, receivers in accordance with the present invention have at least one more (two total) "tracking channel(s)." Preferably, receivers in accordance with the present invention have at least two more (three total) and, in the embodiment illustrated in the drawing, four more (five total) "tracking channels." In the drawings, the additional "tracking channels" are respectively designated 110, 112, 114, and 116. Like channel 98, each of the other "tracking channels" (110, 112, 114, and 116) are connected to the "receiver channel" by line 50 to receive the hard limiter 42 developed signal and to microcomputer 70 by bus 72. Each of the "tracking channels" is similar. Thus, "tracking channel" 110 is shown to employ a phase-controlled PRN-code-signal synthesizer, which is designated 52', a frequency-controller doppler-shifted-carrier-signal synthesizer, which is designated 54', an exclusive-OR gate, which is designated 56', two counters, designated 58' and 60', two additional exclusive-OR gates, designated 62', and 64', an adder 66', another counter 68', another adder 90', and a digital filter 92'.

Microcomputer 70 is operative to, simultaneously, lock the frequency-controlled carrier-signal synthesizers of the "tracking channels" each to the (down converted) signal transmitted by a different satellite. Thus, synthesizer 54 of "tracking channel" 98 is locked to the signal transmitted by a satellite (referred to herein as the jth satellite) at the same time synthesizer 54' of "tracking channel" 110 is locked to the signal transmitted by another satellite (referred to herein as the kth satellite). Also, at the same time, "tracking channel" 112 is locked to another (third) satellite signal; "tracking channel" 114 is locked to still another (fourth) satellite signal; and, "tracking channel" 114 is locked to yet another (fifth) satellite signal. With the numbers required to lock the frequency-controlled carrier-signal synthesizers of the "tracking channels" each to a respective satellite signal, microcomputer 70 employs a differential doppler technique in accordance with the present invention to calculate the receiver velocity.

In accordance with this differential doppler technique, microcomputer 70 calculates a number which represents the difference between the apparent doppler frequency shift of an (L1) carrier signal which is transmitted by one satellite and which is measured over a specific (first) time period and the apparent doppler frequency shift of a carrier signal which is transmitted by another satellite and which is measured over a time period that is, at least substantially, the same as the first period. In understanding this technique, first note that the frequency of the signals developed by a particular frequency-controlled carrier-signal synthesizer is established (in part) by the number represented by the signals developed by microcomputer 70 in controlling the synthesizer (and in part by the synthesizer clock frequency). And, conversely, the frequency of the signals developed by a particular frequency-controlled carrier-signal synthesizer may be determined by microcomputer 70 by reference to the respective control number. Also note that when locked to the frequency of a particular satellite signal the frequency of the signals developed by the respective frequency-controlled carrier-signal synthesizer is the same as the frequency of the respective (down-converted) satellite signal. Further, note that the (down-converted) satellite signal frequency to which a particular frequency-controlled carrier-signal synthesizer is locked differs from four fO (the "receiver channel" IF frequency) by the apparent doppler frequency shift of the (1540 fO L1) signal (transmitted by the respective satellite) due to the velocity of the receiver relative that satellite, plus or minus any error introduced by local oscillator 26 (in down-converting the frequency of the signal).

Next, note that the apparent doppler frequency shift in Hz of the 1540 fO carrier signal of the ith satellite, as measured at the receiver, is given by the above equation (1), (which is reproduced below).

$$D_i = (\bar{v}_i \cdot \bar{r}_i + \bar{v}_u \cdot \bar{r}_i)(2f_c/c) + (f - f_o)$$

Substituting for the jth satellite tracked by "tracking loop" 98, the equation becomes:

$$D_j = (\bar{v}_j \cdot \bar{r}_j + \bar{v}_u \cdot \bar{r}_j)(2f_c/c) + (f - f_o) \quad (2)$$

Similarly, substituting for the kth satellite tracked by "tracking loop" 110, the equation becomes:

$$D_k = (\bar{v}_k \cdot \bar{r}_k + \bar{v}_u \cdot \bar{r}_k)(2f_c/c) + (f - f_o) \quad (3)$$

Subtracting equation (3) from equation (2) yields:

$$D_j - D_k = ((\bar{v}_j \cdot \bar{r}_j + \bar{v}_u \cdot \bar{r}_j) - (\bar{v}_k \cdot \bar{r}_k + \bar{v}_u \cdot \bar{r}_k))(2f_c/c) + ((f - f_o)_{eqn.(2)} - (f - f_o)_{eqn.(3)}) \quad (4)$$

As previously indicated, the $(f - f_O)$ term is a receiver frequency offset (error) in Hz, introduced, at least in part, by the receiver local oscillator (26). Of course, to the extent that the $(f - f_O)$ term from equation (2) is the same as (equals) the $(f - f_O)$ term from equation (3), the two terms cancel in equation (4). It is important to note that if the interval over which the apparent doppler frequency shift $D_j$ for equation (2) is measured is identical to the interval over which the doppler frequency shift $D_k$ for equation (3) is measured, the two terms do cancel. In this case, equation (4) becomes:

$$D_j - D_k = ((\bar{v}_j \cdot \bar{r}_j + \bar{v}_u \cdot \bar{r}_j) - (\bar{v}_k \cdot \bar{r}_k + \bar{v}_u \cdot \bar{r}_k))(2f_c/c) \quad (5)$$

Finally, to the extent that the $(f - f_O)$ terms cancel, the error introduced by the local oscillator 26 is canceled, permitting the use of a relatively less stable, and, thus, relatively less expensive, local oscillator.

In the presently preferred embodiment, the interval over which the apparent doppler frequency shift is measured is approximately 400-500 milliseconds. (In embodiments having less than five "tracking channels," the "tracking channels" are "sequenced," dwelling on each satellite for a period of 500 milliseconds. During each of the 500 milliseconds periods, it takes approximately 100 milliseconds to "acquire" the respective satellite.) Of course, shorter measurement intervals are used in applications in which it is important to measure rapid changes in velocity. Longer measurement intervals are used in applications in which it is important to further reduce (average) the level of noise in each sample.)

Also, in the presently preferred embodiment, samples are taken every one millisecond. Each of the counters (counters 58, 60, and 68 in "tracking channel" 98 and counters 58', 60', and 68' in "tracking channel" 110) are reset once each millisecond responsive to the epoch signal developed by the respective PRN code synthesizer (synthesizer 52 on line 80 in "tracking channel" 98 and synthesizer 52' on line 80' in "tracking channel" 110). As each of the counters is being reset, the contents of the counter is latched (stored) to be read by microcomputer 70 during the subsequent millisecond. Rather than accumulating (averaging) the samples obtained over the 400-500 millisecond period and, then, computing the difference between the accumulated samples of one "tracking channel" and the accumulated samples of another "tracking channel," in the presently preferred embodiment, the difference between individual samples of the two "tracking channels" is computed and the differences are accumulated over the 400-500 millisecond period. It is important to note that, at least with the latter method, the interval over which the apparent doppler frequency shift is measured for one "tracking channel" is not identical to the interval over which the apparent doppler frequency shift is measured for another "tracking channel." This is because the timing for each "tracking channel" is set by the respective epoch (counter resetting) signal. (The timing of each epoch signal is determined by the satellite generating the signal and the satellite to receiver transit time.) However, the (400-500 millisecond) interval over which the apparent doppler frequency shift is measured for one "tracking channel" is the same within plus or minus one half millisecond as the (400-500 millisecond) interval over which the apparent doppler frequency shift is measured for any other "tracking channel."

As previously indicated, receivers in accordance with the present invention have at least two, preferably, at least three, and, ideally, five "tracking channels." Of course, it is important to have two "tracking channels" to measure the apparent doppler frequency shift of the signal transmitted by one satellite during the same interval in which the apparent doppler frequency shift of the signal transmitted by another satellite is measured. However, periodically, (approximately every 15 minutes) it is necessary to monitor (for 30 seconds) the 50 bit per second, navigation data bit stream transmitted by a particular satellite. During this period, especially, If the satellite being monitored is not one of the satellites being used for the velocity calculations, with only two "tracking channels," it may be necessary to abandon the use of the differential doppler technique. Three "tracking channels," permit the use of the differential doppler technique while monitoring the navigation data bit stream transmitted by another satellite. With five "tracking channels," four "tracking channels" can be used for the differential doppler measurements while the fifth "tracking channel" is used to monitor the navigation data bit stream transmitted by a fifth satellite.

In the presently preferred embodiment, "tracking channels" 98 110, and 112 are all integrated in a single gate-array-type device.

It is contemplated that after having read the preceding disclosure, certain alterations and modifications of the present invention will no doubt become apparent to those skilled in the art. It is therefore intended that the following claims be interpreted to cover all such alterations and modifications as fall within the true spirit and scope of the invention.

What is claimed is:

1. A GPS satellite receiver for computing the velocity of the receiver from information obtained from the apparent doppler frequency shift of four carrier signals each transmitted by a respective one of four satellites, the receiver comprising in combination:
   means for receiving each of the carrier signals;
   means for computing,
      a first number which represents the difference between,
         the apparent doppler frequency shift of the received carrier signal which is transmitted by a first one of the satellites and which is measured over a first predetermined time period, and
         the apparent doppler frequency shift of the received carrier signal which is transmitted by one of said satellites other than said first satellite and which is measured over a predetermined time period at least a portion of which includes at least a portion of said first predetermined time period,
      a second number which represents the difference between,
         the apparent doppler frequency shift of the received carrier signal which is transmitted by a second one of said satellites and which is measured over a second predetermined time period, and
         the apparent doppler frequency shift of the received carrier signal which is transmitted by one of said satellites other than said second satellite and which is measured over a predetermined time period at least a portion of which includes at least a portion of said second predetermined time period,
      a third number which represents the difference between,
         the apparent doppler frequency shift of the received carrier signal which is transmitted by a third one of said satellites and which is measured over a third predetermined time period, and
         the apparent doppler frequency shift of the received carrier signal which is transmitted by one of said satellites other than said third satellite and which is measured over a predetermined time period at least a portion of which includes at least a portion of said third predetermined time period; and
   means for computing the velocity of the receiver from said first, said second, and said third numbers.

2. A GPS satellite receiver for computing the velocity of the receiver from information obtained from the apparent doppler frequency shift of four carrier signals each transmitted by a respective one of four satellites, the receiver comprising in combination:
   means for receiving each of the carrier signals;
   means for computing a first number which represents the difference between the apparent doppler frequency shift of the received carrier signal which is transmitted by a jth one of the satellites and which is measured over a first predetermined time period and the apparent doppler frequency shift of the received carrier signal which is transmitted a kth one of said satellites and which is measured over a predetermined time period at least a portion of which includes at least a portion of said first predetermined time period, said first number being equal to:

$$((\bar{v}_j \cdot \bar{r}_j + \bar{v}_u \cdot \bar{r}_j) - (\bar{v}_k \cdot \bar{r}_k + \bar{v}_u \cdot \bar{r}_k))(2f_c/c)$$

where:
   $\bar{v}_j$ is the (three dimensional) velocity of said jth satellite,
   $\bar{r}_j$ is a unit vector pointing from said jth satellite to the receiver,
   $\bar{v}_k$ is the velocity of said kth satellite,
   $\bar{r}_k$ is a unit vector pointing from said kth satellite to said receiver,
   $\bar{v}_u$ is said receiver velocity,
   $f_c$ is the carrier frequency of said satellites, and
   c is the speed of light, a second number which represents the difference between the apparent doppler frequency shift of the received carrier signal which is transmitted by an lth one of said satellites and which is measured over a second predetermined time period and the apparent doppler frequency shift of the received carrier signal which is transmitted by an mth one of said satellites and which is measured over a predetermined time period at least a portion of which includes at least a portion of said second predetermined time period, said second number being equal to:

$$((\bar{v}_l \cdot \bar{r}_l + \bar{v}_u \cdot \bar{r}_l) - (\bar{v}_m \cdot \bar{r}_m + \bar{v}_u \cdot \bar{r}_m))(2f_c/c)$$

where:
   $\bar{v}_l$ is the (three dimensional) velocity of said lth satellite,
   $\bar{r}_l$ is a unit vector pointing from said lth satellite to said receiver,
   $\bar{v}_m$ is the velocity of said mth satellite,
   $\bar{r}_m$ is a unit vector pointing from said mth satellite to said receiver, and a third number which represents the difference between the apparent doppler frequency shift of the received carrier signal which is transmitted by an nth one of said satellites and which is measured over a third predetermined time period and the apparent doppler frequency shift of the received carrier signal which is transmitted by an oth one of said satellites and which is measured over a predetermined time period at least a portion of which includes at least a portion of said third predetermined time period, said third number being equal to:

$$((\bar{v}_n \cdot \bar{r}_n + \bar{v}_u \cdot \bar{r}_n) - (\bar{v}_o \cdot \bar{r}_o + \bar{v}_u \cdot \bar{r}_o))(2f_c/c)$$

where:
   $\bar{v}_n$ is the (three dimensional) velocity of said nth satellite,
   $\bar{r}_n$ is a unit vector pointing from said nth satellite to said receiver,
   $\bar{v}_o$ is the velocity of said oth satellite,
   $\bar{r}_o$ is a unit vector pointing from said oth satellite to said receiver; and
   means for computing the velocity of said receiver from said first, said second, and said third numbers.

3. A GPS satellite receiver for computing the velocity of the receiver from information obtained from the apparent doppler frequency shift of four carrier signals each transmitted by a respective one of four satellites, the receiver comprising in combination:

a receiver channel for receiving each of the carrier signals;

a first tracking channel connected to said receiver channel, said first tracking channel for determining the apparent doppler frequency shift of the one of said received carrier signals which is transmitted by a first one of the satellites;

a second tracking channel connected to said receiver channel, said second tracking channel for determining the apparent doppler frequency shift of the one of said received carrier signals which is transmitted by a second one of said satellites; and computing means connected to said first and said second tracking channels, said computing means for computing a first number which represents the difference between the apparent doppler frequency shift of said first satellite-received-carrier signal measured over a first predetermined time period and the apparent doppler frequency shift of said second satellite-received-carrier signal measured over a predetermined time period at least a portion of which includes at least a portion of said first predetermined time period and for computing the velocity of the receiver with said first number.

4. A GPS satellite receiver as recited in claim 3 further comprising a third tracking channel connected to said receiver channel, said third tracking channel for determining the apparent doppler frequency shift of the one of said received-carrier signals which is transmitted by a third one of said satellites, wherein said computing means further computes a second number which represents the difference between the apparent doppler frequency shift of said first satellite-received-carrier signal measured over said first predetermined time period and the apparent doppler frequency shift of said third satellite-received-carrier signal measured over a predetermined time period at least a portion of which includes at least a portion of said first predetermined time period, and wherein said computing means further computes the velocity of said receiver with said first and said second numbers.

5. A GPS satellite receiver as recited in claim 4 further comprising a fourth tracking channel connected to said receiver channel, said fourth tracking channel for determining the apparent doppler frequency shift of the one of said received-carrier signals which is transmitted by a fourth one of said satellites and a fifth tracking channel connected to said receiver channel, wherein said computing means further computes a third number which represents the difference between the apparent doppler frequency shift of said first satellite-received-carrier signal measured over said first predetermined time period and the apparent doppler frequency shift of said fourth satellite-received-carrier signal measured over a predetermined time period at least a portion of which includes at least a portion of said first predetermined time period, and wherein said computing means further computes the velocity of said receiver from said first, said second, and said third numbers.

6. A GPS satellite receiver as recited in claim 3 wherein said first tracking channel includes carrier-synthesizer means for generating a signal having a frequency established by a first set of number signals and counter means connected to said receiver channel and connected to said first tracking-channel-carrier-synthesizer means, said first tracking-channel-counter means for developing signals representing a count which is incremented at each of a series of times marked by said first tracking-channel-carrier-synthesizer-means-generated signal when a signal developed from said first satellite-received-carrier signal has a predetermined one of two states and decremented at each of said first tracking-channel-carrier-synthesizer-means-generated-signal marked times otherwise, wherein said second tracking channel includes carrier-synthesizer means for generating a signal having a frequency established by a second set of number signals and counter means connected to said receiver channel and connected to said second tracking-channel-carrier-synthesizer means, said second tracking-channel-counter means for developing signals representing a count which is incremented at each of a series of times marked by said second tracking-channel-carrier-synthesizer-means-generated signal when a signal developed from said second satellite-received-carrier signal has a predetermined one of two states and decremented at each of said second tracking-channel-carrier-synthesizer-means-generated-signal marked times otherwise, wherein said computing means is responsive to said first tracking-channel-counter-means-developed signals and operative to develop said first tracking-channel-carrier-synthesizer-means-first-number signals so as to lock the frequency of said first tracking-channel-carrier-synthesizer-means-generated signal to the frequency of said first-satellite-received-carrier signal, and wherein said computing means is responsive to said second tracking-channel-counter-means-developed signals and operative to develop said second tracking-channel-carrier-synthesizer-means-second-number signals so as to lock the frequency of said second tracking-channel-carrier-synthesizer-means-generated signal to the frequency of said second-satellite-received-carrier signal.

7. A GPS satellite receiver for computing the velocity of the receiver from information obtained from the apparent doppler frequency shift of four carrier signals each transmitted by a respective one of four satellites and each biphase modulated by a respective PRN code, the receiver comprising in combination:

a receiver channel for receiving and for down-converting the frequency of each of the carrier signals;

a first tracking channel connected to said receiver channel, said first tracking channel for determining the apparent doppler frequency shift of the one of said down-converted-carrier signals which is transmitted by a first one of the satellites, said first tracking channel including, carrier-synthesizer means for generating a first signal having a frequency established by a first set of number signals;

PRN-code-synthesizer means for generating an early, a punctual, and a late signal each representing said first satellite-PRN code and each having a phase established by first tracking-channel-PRN-code-synthesizer-means-driving signals;

exclusive-OR-gate means connected to said first tracking-channel-PRN-code-synthesizer means and connected to said receiver channel, said first tracking-channel-exclusive-OR-gate means for comparing the state of a signal developed from said first satellite-down-converted-signal with the state of said first tracking-channel-PRN-code-synthesizer-means-generated punctual signal to develop a signal, Q-counter means connected to said first tracking-channel-carrier-synthesizer means and connected to said first tracking-channel-exclusive-OR-gate means, said first tracking-channel-Q-counter means for developing signals representing a count which is incremented at each of a series of times marked by said first tracking-channel-carrier-synthesizer-means-generated first signal when said first tracking-channel-exclusive-OR-gate-developed signal has a predetermined one of two states and decremented at each of said first tracking-channel-carrier-synthesizer-means-generated-first-signal marked times otherwise;

a second tracking channel connected to said receiver channel, said second tracking channel for determining the apparent doppler frequency shift of the one of said received carrier signals which is transmitted by a second one of the satellites, said second tracking channel including, carrier-synthesizer means for generating a first signal having a frequency established by a second set of number signals;

PRN-code-synthesizer means for generating an early, a punctual, and a late signal each representing said second satellite-PRN code and each having a phase established by second tracking-channel-PRN-code-synthesizer-means-driving signals;

exclusive-OR-gate means connected to said second tracking-channel-PRN-code-synthesizer means and connected to said receiver channel, said second tracking-channel-exclusive-OR-gate means for comparing the state of a signal developed from said second satellite-down-converted-signal with the state of said second tracking-channel-PRN-code-synthesizer-means-generated punctual signal to develop a signal, Q-counter means connected to said second tracking-channel-carrier-synthesizer means and connected to said second tracking-channel-exclusive-OR-gate means, said second tracking-channel-Q-counter means for developing signals representing a count which is incremented at each of a series of times marked by said second tracking-channel-carrier-synthesizer-means-generated first signal when said second tracking-channel-exclusive-OR-gate-developed signal has a predetermined one of two states and decremented at each of said second tracking-channel-carrier-synthesizer-means-generated-first-signal marked times otherwise; and computer means connected to said first tracking-channel-carrier-synthesizer means, connected to said first tracking-channel-Q-counter means, connected to said second tracking-channel-carrier-synthesizer means, and connected to said second tracking-channel-Q-counter means, said computer means being responsive to said first tracking-channel-Q-counter-means-developed signals and operative to develop said first tracking-channel-carrier-synthesizer-means-driving first number signals so as to lock the frequency of said first tracking-channel-carrier-synthesizer-means-generated first signal to the frequency of said first satellite-down-converted-signal and responsive to said second tracking-channel-Q-counter-means-developed signals and operative to develop said second tracking-channel-carrier-synthesizer-means-driving second number signals so as to lock the frequency of said second tracking-channel-carrier-synthesizer-means-generated first signal to the frequency of said second satellite-down-converted-signal.

8. A GPS satellite receiver as recited in claim 7 wherein said a first tracking channel further includes early/late means connected to said first tracking-channel-PRN-code-synthesizer means, connected to said first tracking-channel-carrier-synthesizer means, connected to said receiver channel, and connected to said computer means, said first tracking-channel-early/late means for comparing the state of said signal developed from said first satellite-down-converted-signal with the state of said early and said late first tracking-channel-PRN-code-synthesizer-means-developed signals to develop controller-means-driving signals representing the difference between an early and a late count, wherein said a second tracking channel further includes early/late means connected to said second tracking-channel-PRN-code-synthesizer means, connected to said second tracking-channel-carrier-synthesizer means, connected to said receiver channel, and connected to said computer means, said second tracking-channel-early/late means for comparing the state of said signal developed from said second satellite-down-converted-signal with the state of said early and said late second tracking-channel-PRN-code-synthesizer-means-developed signals to develop controller-means-driving signals representing the difference between an early and a late count, wherein said controller means is further responsive to said first tracking-channel-early/late-means-developed signals and operative to develop said first tracking-channel-PRN-code-synthesizer-means-driving signals so as to lock the phase of said first tracking-channel-PRN-code-synthesizer-developed signals to said first satellite-signal PRN-code phase, and wherein said controller means is further responsive to said second tracking-channel-early/late-means-developed signals and operative to develop said second tracking-channel-PRN-code-synthesizer-means-driving signals so as to lock the phase of said second tracking-channel-PRN-code-synthesizer-developed signals to said second satellite-signal PRN-code phase.

9. A GPS satellite receiver as recited in claim 8 wherein said first tracking-channel-carrier-synthesizer means further generates a second signal which is in phase quadrature with said first tracking-channel-carrier-synthesizer-means-generated first signal, wherein said first tracking channel further includes I-counter means connected to said first tracking-channel-exclusive-OR-gate means, connected to said first tracking-channel-carrier-synthesizer means and connected to said computer means, said first tracking-channel-I-counter means for developing computer-means-driving signals representing a count which is incremented at each of a series of times marked by said first tracking-channel-carrier-synthesizer-means-generated-second signal when said first tracking-channel-exclusive-OR-gate-developed signal has a predetermined one of two states and decremented at each of said first tracking-channel-carrier-synthesizer-means-generated-second signal marked times otherwise, wherein said second tracking-channel-carrier-synthesizer means further generates a second signal which is in phase quadrature with said second tracking-channel-carrier-synthesizer-means-generated first signal, and wherein said second tracking channel further includes I-counter means connected to said second tracking-channel-exclusive-OR-gate means, connected to said second tracking-channel-carrier-synthesizer means and connected to said computer means, said second tracking-channel-I-counter means for developing computer-means-driving signals representing a count which is incremented at each of a series of times marked by said second tracking-channel-carrier-synthesizer-means-generated-second signal when said second tracking-channel-exclusive-OR-gate-developed signal has a predetermined one of two states and decremented at each of said second tracking-channel-carrier-synthesizer-means-generated-second signal marked times otherwise.

10. A GPS satellite receiver as recited in claim 7 wherein said first tracking-channel-carrier-synthesizer means further generates a second signal which is in phase quadrature with said first tracking-channel-carrier-synthesizer-means-generated first signal, wherein said first tracking channel further includes I-counter means connected to said first tracking-channel-exclusive-OR-gate means, connected to said first tracking-channel-carrier-synthesizer means and connected to said computer means, said first tracking-channel-I-counter means for developing computer-means-driving signals representing a count which is incremented at each of a series of times marked by said first tracking-channel-carrier-synthesizer-means-generated-second signal when said first tracking-channel-exclusive-OR-gate-developed signal has a predetermined one of two states and decremented at each of said first tracking-channel-carrier-synthesizer-means-generated-second signal marked times otherwise, wherein said second tracking-channel-carrier-synthesizer means further generates a second signal which is in phase quadrature with said second tracking-channel-carrier-synthesizer-means-generated first signal, and wherein said second tracking channel further includes I-counter means connected to said second tracking-channel-exclusive-OR-gate means, connected to said second tracking-channel-carrier-synthesizer means and connected to said computer means, said second tracking-channel-I-counter means for developing computer-means-driving signals representing a count which is incremented at each of a series of times marked by said second tracking-channel-carrier-synthesizer-means-generated-second signal when said second tracking-channel-exclusive-OR-gate-developed signal has a predetermined one of two states and decremented at each of said second tracking-channel-carrier-synthesizer-means-generated-second signal marked times otherwise.

* * * * *